United States Patent
Handa et al.

(10) Patent No.: US 11,028,915 B2
(45) Date of Patent: Jun. 8, 2021

(54) FLAT STRAIN WAVE GEARING

(71) Applicant: HARMONIC DRIVE SYSTEMS INC., Tokyo (JP)

(72) Inventors: Jun Handa, Azumino (JP); Hiroaki Kimura, Azumino (JP); Sotaro Miyake, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 547 days.

(21) Appl. No.: 15/781,751

(22) PCT Filed: Dec. 11, 2015

(86) PCT No.: PCT/JP2015/084835
§ 371 (c)(1),
(2) Date: Jun. 6, 2018

(87) PCT Pub. No.: WO2017/098663
PCT Pub. Date: Jun. 15, 2017

(65) Prior Publication Data
US 2018/0363750 A1    Dec. 20, 2018

(51) Int. Cl.
*F16H 1/32* (2006.01)
*F16H 49/00* (2006.01)
*F16H 57/021* (2012.01)

(52) U.S. Cl.
CPC ......... *F16H 49/001* (2013.01); *F16H 57/021* (2013.01)

(58) Field of Classification Search
CPC .............................. F16H 49/001; F16H 57/021

USPC ........................................................... 74/640
See application file for complete search history.

(56) References Cited

U.S. PATENT DOCUMENTS 5,302,160 A    4/1994 Fujioka

FOREIGN PATENT DOCUMENTS

| JP | S-56-59339 U | 5/1981 |
| JP | H-02-125255 U | 10/1990 |
| JP | 3-119643 | * 12/1991 |
| JP | H-03-119643 U | 12/1991 |

(Continued)

OTHER PUBLICATIONS

International Search Report (PCT/ISA/210) dated Feb. 9, 2016, by the Japan Patent Office as the International Searching Authority for International Application No. PCT/JP2015/084835 (5 pages).

(Continued)

*Primary Examiner* — William C Joyce
(74) *Attorney, Agent, or Firm* — Buchanan Ingersoll & Rooney PC

(57) ABSTRACT

A restraint mechanism for limiting the movement of the flexible external gear of a flat strain wave gearing in the axial direction has a first restraining member installed in a floating state in a first recess and a second restraining member installed in a floating state in a second recess. The restraining member is able to limit the movement of the flexible external gear in the axial direction to a range in which there are no difficulties during actual use. Moreover, compared with when movement of the flexible external gear is limited using members that are disposed at fixed positions, it is possible to reduce the sliding abrasion that occurs between the flexible external gear and the first and second restraining members.

5 Claims, 3 Drawing Sheets

(56) References Cited

FOREIGN PATENT DOCUMENTS

| JP | H-09-250611 A | | 9/1997 |
|---|---|---|---|
| JP | 2010-255645 A | | 11/2010 |
| JP | 2013-177938 | * | 9/2013 |
| JP | 2013-177938 A | | 9/2013 |

OTHER PUBLICATIONS

Written Opinion (PCT/ISA/237) dated Feb. 9, 2016, by the Japan Patent Office as the International Searching Authority for International Application No. PCT/JP2015/084835 (3 pages).

* cited by examiner

FIG. 2

FIG. 3 (a)
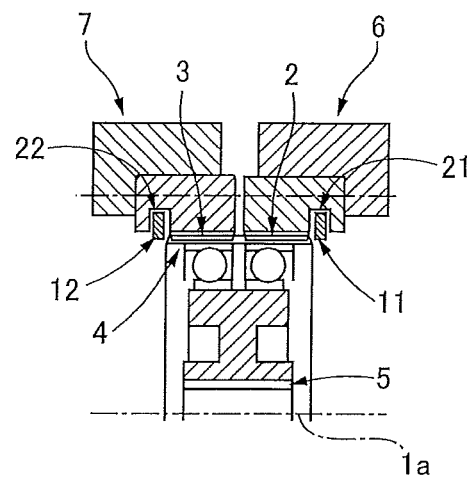
FIG. 3 (b)
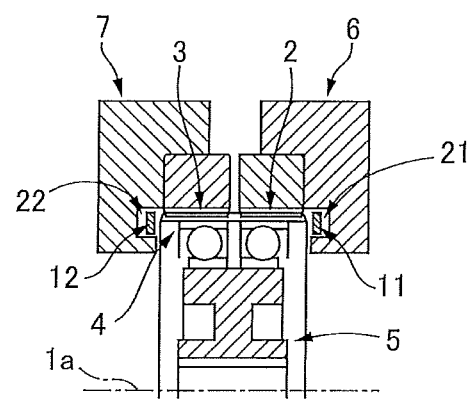
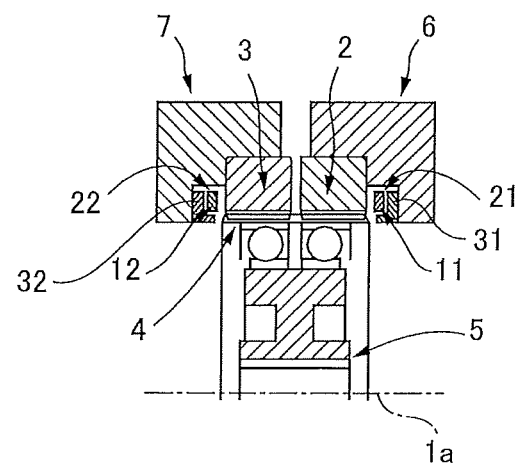
FIG. 3 (c)

FLAT STRAIN WAVE GEARING

TECHNICAL FIELD

The present invention relates to a flat strain wave gearing having two rigid internal gears and a cylindrical flexible gear disposed inside the internal gears, and more specifically to a restraining mechanism for limiting the movement of the flexible external gear in the axial direction.

BACKGROUND ART

In a flat strain wave gearing, a cylindrical flexible external gear that meshes with two rigid internal gears is caused to move in the axial direction by thrust force applied during operation. Parts are therefore required to limit the movement of the flexible external gear in the axial direction. In Patent document 1, restraining members for limiting the movement of a flexible external gear are disposed on both sides of the flexible external gear, the coefficient of friction between the restraining members and members on which the restraining members slide is adjusted, whereby reducing abrasion of the end sections of the external gear.

PRIOR ART DOCUMENT

Patent Document

Patent document 1: JP 2013-177938 A

SUMMARY OF THE INVENTION

Problems to Be Solved By the Invention

Conventional parts for limiting the movement of an external gear in the axial direction are disposed at fixed positions along the axial direction. When the external gear moves in the axial direction during operation, it abuts against the restraining parts disposed at the fixed positions, so that sliding abrasion occurs between them. It is difficult to reliably reduce abrasion in the end sections of the external gear occurred due to sliding of the external gear on the restraining parts.

In view of the above, an object of the present invention is to provide a flat strain wave gearing which is able to limit the movement of the external gear in the axial direction within a range in which there are no difficulties during actual use, whereby reliably reducing abrasion of the end sections of the external gear caused by limiting the movement of the external gear in the axial direction.

Means of Solving the Problems

In order to solve the above problems, a flat strain wave gearing of the present invention has:
 a first rigid internal gear;
 a second rigid internal gear;
 a cylindrical flexible external gear capable of meshing with the first and second rigid internal gears;
 a wave generator that flexes the flexible external gear into a non-circular shape to partially mesh with the first and second rigid internal gears and that moves meshing positions therebetween in a circumferential direction; and
 a restraining mechanism that limits movement of the flexible external gear in an axial direction.
 In addition, the restraining mechanism has:
 annular first and second restraining members;
 an annular first recess where the first restraining member is accommodated in a floating state in which it is capable of moving by predetermined amounts in the axial direction and a radial direction and is capable of rotating; and
 an annular second recess where the second restraining member is accommodated in the floating state.

Furthermore, the first restraining member faces a first external-gear end face on one side of the flexible external gear in the axial direction, and the second restraining member faces a second external-gear end face on the other side of the flexible external gear.

The first and second restraining members for limiting the movement of the flexible external gear in the axial direction are accommodated in the first and second recesses in the floating state. The movement of the flexible external gear in the axial direction can therefore be limited to a rage in which there are no difficulties during actual use. In addition, compared with a case in which restraining members are disposed at fixed positions in the axial direction, it is possible to reduce sliding abrasion that occurs between the flexible external gear and the first and second restraining members.

When a first housing is attached to the first rigid internal gear and a second housing is attached to the second rigid internal gear in the flat strain wave gearing of the present invention, the first recess can be formed between the first housing and a first internal-gear end face of the first rigid internal gear on the side of the first external-gear end face. The second recess can be formed between the second housing and a second internal-gear end face of the second rigid internal gear on the side of the second external-gear end face.

Alternatively, it is possible that the first recess is formed in the first housing itself and the second recess is formed in the second housing itself.

Furthermore, the first and second recesses can be formed by using additional members. For example, when there is provided a first member attached to at least either one of the first housing and the first rigid internal gear, the first recess can be formed in the first member itself, between two members of the first member and the first housing, between two members of the first member and the first rigid internal gear, or among three members of the first member, the first housing and the first rigid internal gear.

Likewise, when there is provided a second member attached to at least either one of the second housing and the second rigid internal gear, the second recess can be formed in the second member itself, between two members of the second member and the second housing, between two members of the second member and the second rigid internal gear, or among three members of the second member, the second housing and the second rigid internal gear.

The first recess can also be formed in a portion of the first rigid internal gear other than internal-tooth forming portion thereof, and the second recess be formed in a portion of the second rigid internal gear other than internal-tooth forming portion thereof.

The first and second recesses can be formed employing combinations of the above-mentioned recess forming manners. For example, it is possible that one of the first and second recesses is formed in the rigid internal gear, and the other is formed in the housing. It is also possible that one of the recesses is formed in the rigid internal gear or the housing and the other is formed between two members of the rigid internal gear and the housing.

It is desirable that the first and second recesses are a recess opening inward in the radial direction. The first and second recesses where the first and second restraining members are accommodated become a sufficiently lubricated state by centrifugal force during operation of the flat strain wave gearing. This makes it possible to reduce abrasion in the first and second external-gear end faces of the flexible external gear sliding against the first second restraining members.

It is desirable that the first and second restraining members have a surface hardness that is lower than the surface hardness of the first and second external-gear end faces of the flexible external gear. This allows to reduce the sliding abrasion occurred in the first and second external-gear end faces of the flexible external gear with which the first and second restraining members come in contact.

The surface hardness of the first and second restraining members can be set, for example, to have a value within 90% to 99% of the surface hardness of the first and second external-gear end faces of the flexible external gear.

BRIEF DESCRIPTION OF THE DRAWINGS

FIG. 2 is an enlarge partial longitudinal cross-sectional view illustrating a restraining mechanism for limiting the movement of the flexible external gear in the axial direction in the flat strain wave gearing of FIGS. 1(a) and 1(b); and FIGS. 3(a)-3(c) are a semi cross-sectional view illustrating three examples of a flat strain wave gearing according to the present invention.

MODE FOR CARRYING OUT THE INVENTION

Embodiments of a flat strain wave gearing according to the present invention will be described hereinbelow with reference to the drawings.

Figure 1:
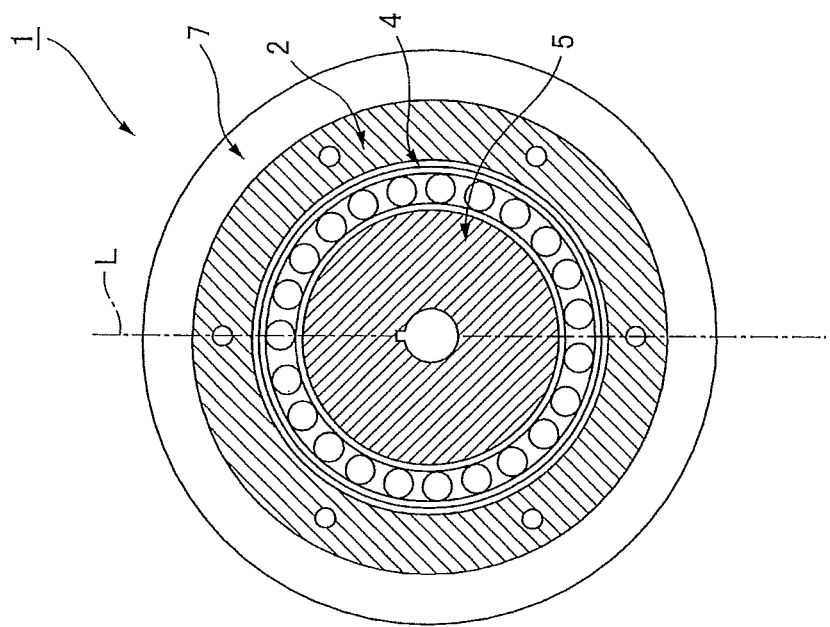
FIGS. 1(a) and 1(b) are a longitudinal cross-sectional view and a lateral cross-sectional view illustrating an example of a flat strain wave gearing according to the present invention.
Figure 1:
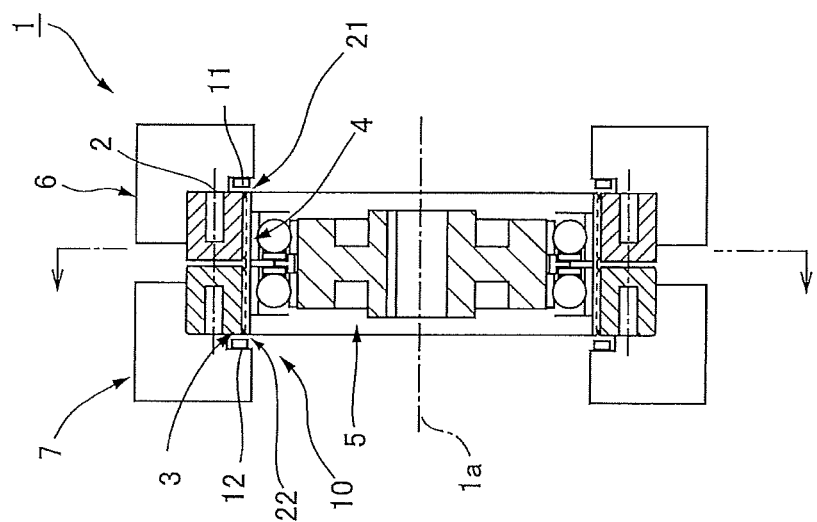

FIG. 1(a) is a longitudinal cross-sectional view of a flat strain wave gearing according to the present embodiment and FIG. 1(b) is a lateral cross-sectional view thereof. The flat strain wave gearing 1 is provided with a first rigid internal gear 2, a second rigid internal gear 3, a cylindrical flexible external gear 4 disposed coaxially inside these internal gears, and an ellipsoidally contoured wave generator 5 fitted into the inner side of the flexible external gear 4. The flexible external gear 4 is flexed into an ellipsoidal shape by the wave generator to mesh with the first and second rigid internal gears 2 and 3 at positions on the major axis L of the ellipsoidal shape thereof.

The first rigid internal gear 2 is fixed to a fixed-side housing 6 (a first housing) so as not to rotate, for example, while the second rigid internal gear 3 is fixed to a rotational-side housing 7. The rotational-side housing is supported via a not-depicted bearing by the fixed-side housing 6 in a free rotating state. The second rigid internal gear 3 has the number of teeth that is 2n (n being a positive integer) less than the number of teeth of the first rigid internal gear 2. The flexible external gear 4 has the number of teeth that is the same as that of the second rigid internal gear 3. The wave generator 5 is driven to rotate by a motor et. al.

When the wave generator 5 rotates, meshing positions between the first and second rigid internal gears 2, 3 and the flexible external gear 4 are moved in the circumferential direction. Because the number of teeth of the first rigid internal gear 2 is 2n greater than the number of teeth of the flexible external gear 4, the flexible external gear 4 is caused to rotate relative to the fixed-side first rigid internal gear 2 according to the difference in the number of teeth therebetween. The other second rigid internal gear 3 has the same number of teeth as the flexible external gear 4, and therefore rotates integrally with the flexible external gear 4. The second rigid internal gear 3 is linked to a load-side member to be driven (not illustrated in the drawing), and the output rotation of the second rigid internal gear 3 is taken out to the load-side via the rotational-side housing 7 (output shaft).

Here, the flat strain wave gearing 1 is provided with a restraining mechanism 10 that limits the movement of the flexible external gear 4 in the axial direction 1a during operation. The restraining mechanism 10 has a first restraining member 11 and a second restraining member 12, these members having an annular shape.

Figure 2:
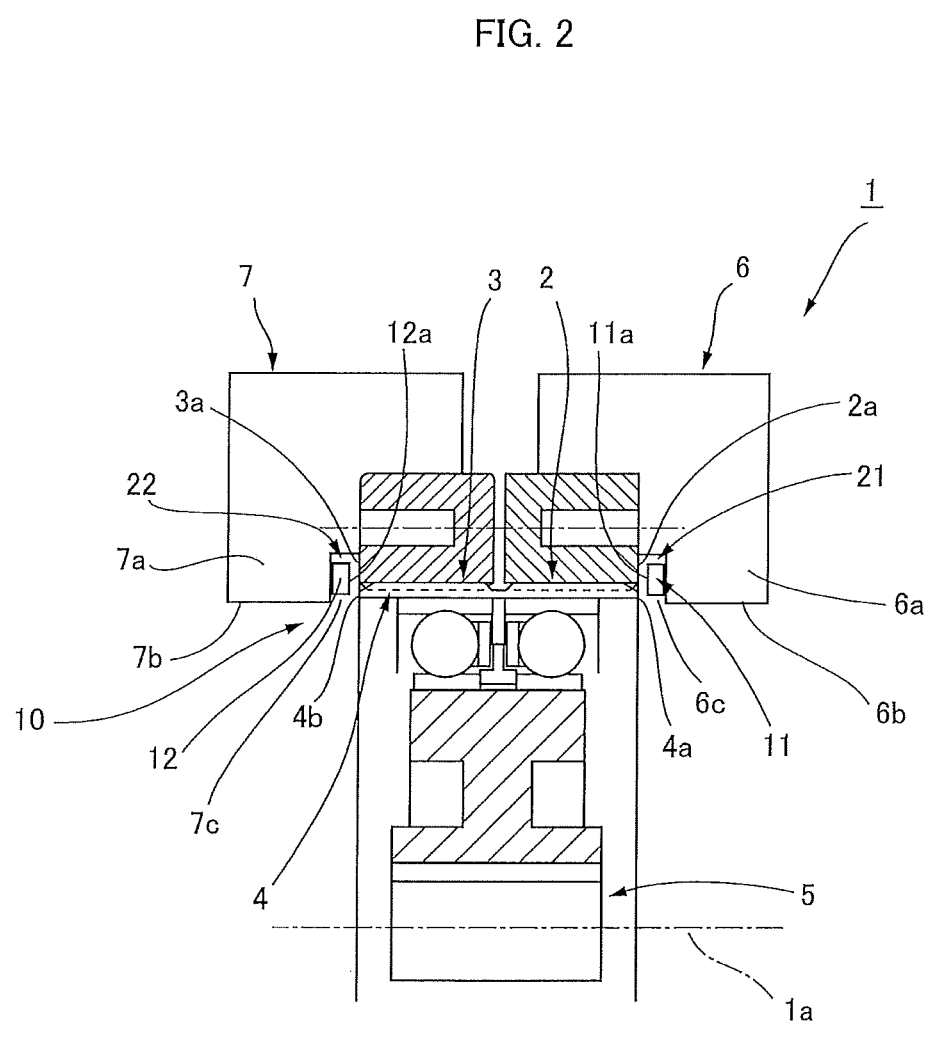

FIG. 2 is an enlarged partial longitudinal cross-sectional view illustrating a portion of the flat strain wave gearing 1 where the restraining mechanism 10 is included. Explaining with reference to this drawing, the restraining mechanism 10 has the first and second restraining members 11 and 12 made from an annular-shaped plate, and a first and second recesses 21 and 22 where the first and second restraining members 11 and 12 are accommodated in a floating state, respectively.

The first restraining member 11 faces, in the axial direction 1a, a first external-gear end face 4a which is one end face of the flexible external gear 4 in the axial direction 1a. The second restraining member 12 faces, in the axial direction 1a, a second external-gear end face 4b which is the other end face of the flexible external gear 4 in the axial direction.

The first recess 21 is an annular recess opening inward in the radial direction, and is formed between the fixed-side housing 6 and the first rigid internal gear 2. The fixed-side housing 6 is provided with an annular protrusion 6a having a rectangular cross section. The annular protrusion 6a protrudes inward in the radial direction along a first internal-gear end face 2a of the first rigid internal gear 2 on the opposite side of the second rigid internal gear 3. The annular protrusion 6a has a circular inner peripheral surface 6b positioned on a radially inner side from the first external-gear end face 4a of the flexible external gear 4. The first internal-gear end face 2a and an annular groove 6c opening inward in the radial direction are formed in the portion adjacent to the circular inner peripheral surface 6b on the side of the first internal-gear end face 2a. The annular first recess 21 having a rectangular cross section is defined by the annular groove 6c and the inner-peripheral-side end face portion of the first internal-gear end face 2a facing the annular groove 6c.

The first restraining member 11 is an annular plate having a rectangular cross section, one annular end face 11a of which faces the first external-gear end face 4a of the flexible external gear 4 in the axial direction 1a. The first restraining member 11 is not fixed to the fixed-side housing 6 or the first rigid internal gear 2. The first restraining member has a width (thickness in the axial direction) narrower than the width of the first recess 21 and has a height smaller than the depth of the first recess 21. The first restraining member 11 is accommodated in the first recess 21 in a floating state. Specifically, the first restraining member 11 is accommodated in the first recess 21 in a state capable of moving in the axial direction 1a and in the radial direction by predetermined amounts, and is also accommodated in the first recess 21 in a rotatable state.

Here, the first restraining member 11 has an annular end face 11a, the surface hardness of the end face being set approximately to be from 90% to 99% of the surface hardness of the first external-gear end face 4a of the flexible external gear 4 in order to reduce the sliding abrasion of the first external-gear end face 4a. In other words, the material of the first restraining member 11 is selected so that the surface hardness of the first restraining member 11 is lower than and close to the surface hardness of the flexible external gear 4. Alternatively, the surface hardness of the annular end face 11a of the first restraining member 11 is adjusted by applying thermal treatment or another surface treatment to the annular end face 11a.

The other second restraining member 12 and the second recess 22 are configured to have a symmetrical structure with the first restraining member 11 and the first recess 21 in the axial direction 1a. Specifically, the second recess 22 is an annular recess opening inward in the radial direction and is formed between the rotational-side housing 7 and the second rigid internal gear 3. The rotational-side housing 7 is provided with an annular protrude 7a having a rectangular cross section. The annular protrude 7a protrudes inward in the radial direction along the second internal-gear end face 3a of the second rigid internal gear 3 on the opposite side of the first rigid internal gear 2. The annular protrude 7a has a circular inner peripheral surface 7b positioned on an inner side in the radial direction than the second external-gear end face 4b of the flexible external gear 4. The second internal-gear end face 3a and an annular groove 7c opening inward in the radial direction are formed in a portion adjacent to the circular inner peripheral surface 7b on the side of the second internal-gear end face 3c. The annular second recess 22 having a rectangular cross section is defined by the annular groove 7c and an inner-peripheral-side end face portion of the second internal-gear end face 3a facing the annular groove 7c.

The second restraining member 12 accommodated in the second recess 22 is an annular plate having a rectangular cross section, one annular end face 12 of which faces the second external-gear end face 4b of the flexible external gear 4 in the axial direction 1a. The second restraining member 12 is not fixed to the rotational-side housing 7 or the second rigid internal gear 3. The second restraining member has a width (thickness in the axial direction 1a) narrower than the width of the second recess 22 and has a height smaller than the depth of the second recess 22. The second restraining member 12 is accommodated in the second recess 22 in a floating state. Specifically, the second restraining member 12 is accommodated in the second recess 22 in a state capable of moving in the axial direction 1a and in the radial direction by predetermined amounts, and is also accommodated in the second recess 22 in a rotatable state.

In addition, the second restraining member 12 has an annular end face 12a, the surface hardness of the end face being set approximately to be from 90% to 99% of the surface hardness of the second external-gear end face 4b of the flexible external gear 4 in order to reduce the sliding abrasion of the second external-gear end face 4b. In other words, the material of the second restraining member 12 is selected so that the surface hardness of the second restraining member 12 is lower than and close to the surface hardness of the flexible external gear 4. Alternatively, the surface hardness of the annular end face 12a of the second restraining member 12 is adjusted by applying thermal treatment or another surface treatment to the annular end face 12a.

During operation of the flat strain wave gearing 1, the flexible external gear 4 is applied with thrust force and is moved in the axial direction 1a. The first and second restraining members 11 and 12 are disposed on both sides of the flexible external gear 4. If the flexible external gear 4 moves toward the first rigid internal gear 2, for example, the first external-gear end face 4a thereof comes in contact with the annular end face 11a of the first restraining member 11, whereby the movement of the flexible external gear is limited.

Because the first restraining member 11 is accommodated in the first recess 21 in the floating state, it is possible to avoid such a situation that the first external-gear end face 4a is pressed against the first restraining member 11 with excessive force and the both members are slid with each other in this state. In addition, the surface hardness of the annular end face 11a of the first restraining member 11 is set to be lower than the surface hardness of the first external-gear end face 4a, whereby the sliding abrasion occurred in the first external-gear end face 4a side can be reduced. Furthermore, lubricant is forced to move toward the outer peripheral side by centrifugal force that is generated by the wave generator 5 rotating at high speeds, and enters the first and second recesses 21 and 22 opening inward in the radial direction, so that these first and second recesses 21 and 22 serve as a lubricant reservoir. The sliding portions of the first and second restraining members 11, 12 accommodated in the recesses against the other members come into a sufficiently lubricated state, whereby the sliding abrasion occurred in these portions can be reduced.

In some cases, the annular end faces 11a and 12a of the first and second restraining members 11 and 12, which come in contact with the flexible external gear 4, need to be applied with thermal treatment or other surface treatments in order to adjust the surface hardness thereof. Cost increases for surface treatment such as thermal treatment can be minimized because these annular end faces 11a and 12a have only a small area.

In the present example, the annular plates having a rectangular cross section are used for the first and second restraining members 11 and 12. The first and second restraining members 11 and 12 may have a cross-sectional shape other than a rectangular cross-sectional shape, such as circular, ellipsoidal or other cross-sectional shape. In addition, the cross-sectional shape of the first and second recesses 21 and 22 may also be other than a rectangular cross-sectional shape, such as a semi-circular cross-sectional shape.

Another Embodiments

In the above-mentioned example, the first and second recesses are formed between the fixed-side housing and the first rigid internal gear, and between the rotational-side housing and the second rigid internal gear, respectively. For example, as shown in FIG. 3(a), the first recess 21 for accommodating the first restraining member 11 can be formed in a section of the first rigid internal gear 2 other than the internal-tooth forming portion thereof, and the second recess 22 for accommodating the second restraining member 12 can be formed in a section of the second rigid internal gear 3 other than the internal-tooth forming portion thereof.

In addition, as shown in FIG. 3(b), the first recess 21 for accommodating the first restraining member 11 may be formed in the fixed-side housing 6, and the second recess 22 for accommodating the second restraining member 12 may be formed in the rotational-side housing 7.

Furthermore, the first and second recesses 21 and 22 may also be formed by using members other than the rigid internal gears 2, 3 and housings 6 and 7. For example, as shown in FIG. 3(c), it is possible that a first member 31 is attached to the fixed-side housing 6 to form the first recess 21 between two members of the first member 31 and the rigid internal gear 2, and that a second member 32 is attached to the rotational-side housing 7 to form the second recess 22 between two members of the second member 32 and the second rigid internal gear 3.

In the above-mentioned flat strain wave gearing, the flexible external gear is made to flex into an ellipsoidal shape. The present invention can also be applied to a flat strain wave gearing having a configuration in which the flexible external gear is made to flex into a non-circular shape other than an ellipsoidal shape so as to mesh with the rigid internal gear.

The invention claimed is:

1. A flat strain wave gearing comprising:
a first rigid internal gear;
a second rigid internal gear;
a cylindrical flexible external gear capable of meshing with the first and second rigid internal gears;
a wave generator that flexes the flexible external gear into a non-circular shape to partially mesh with the first and second rigid internal gears and that moves meshing positions therebetween in a circumferential direction; and
a restraining mechanism that limits movement of the flexible external gear in an axial direction,
wherein the restraining mechanism has:
annular first and second restraining members for limiting the movement of the flexible external gear in the axial direction;
an annular first recess where the first restraining member is accommodated in a floating state in which it is movable in the axial direction and in a radial direction by a predetermined amount and is movable in a circumferential direction; and
an annular second recess where the second restraining member is accommodated in the floating state; and
wherein the first restraining member faces a first external-gear end face on one side of the flexible external gear in the axial direction, and the second restraining member faces a second external-gear end face on the other side of the flexible external gear;
wherein the first recess is formed in a section of the first rigid internal gear other than internal-tooth forming portion thereof; and
the second recess is formed in a section of the second rigid internal gear other than internal-tooth forming portion thereof.

2. The A flat strain wave gearing according to claim 1, comprising:
a first rigid internal gear;
a second rigid internal gear;
a cylindrical flexible external gear capable of meshing with the first and second rigid internal gears;
a wave generator that flexes the flexible external gear into a non-circular shape to partially mesh with the first and second rigid internal gears and that moves meshing positions therebetween in a circumferential direction; and
a restraining mechanism that limits movement of the flexible external gear in an axial direction,
wherein the restraining mechanism has:
annular first and second restraining members for limiting the movement of the flexible external gear in the axial direction;
an annular first recess where the first restraining member is accommodated in a floating state in which it is movable in the axial direction and in a radial direction by a predetermined amount and is movable in a circumferential direction; and
an annular second recess where the second restraining member is accommodated in the floating state; and
wherein the first restraining member faces a first external-gear end face on one side of the flexible external gear in the axial direction, and the second restraining member faces a second external-gear end face on the other side of the flexible external gear;
wherein the first and second recesses are open inward in the radial direction.

3. The flat strain wave gearing according to claim 2, wherein the first and second restraining members have a surface hardness that is lower than a surface hardness of the first and second external-gear end faces of the flexible external gear.

4. The flat strain wave gearing according to claim 2, wherein the first and second restraining members have a surface hardness having a value within a range from 90% to 99% of the surface hardness of the first and second external-gear end faces of the flexible external gear.

5. A flat strain wave gearing comprising:
a first rigid internal gear;
a second rigid internal gear;
a cylindrical flexible external gear capable of meshing with the first and second rigid internal gears;
a wave generator that flexes the flexible external gear into a non-circular shape to partially mesh with the first and second rigid internal gears and that moves meshing positions therebetween in a circumferential direction; and
a restraining mechanism that limits movement of the flexible external gear in an axial direction,
wherein the restraining mechanism has:
annular first and second restraining members for limiting the movement of the flexible external gear in the axial direction;
an annular first recess where the first restraining member is accommodated in a floating state in which it is movable in the axial direction and in a radial direction by a predetermined amount and is movable in a circumferential direction; and
an annular second recess where the second restraining member is accommodated in the floating state; and
wherein the first restraining member faces a first external-gear end face on one side of the flexible external gear in the axial direction, and the second restraining member faces a second external-gear end face on the other side of the flexible external gear; and
further comprising:
a first housing to which the first rigid internal gear is attached; and
a second housing to which the second rigid internal gear is attached,
wherein the first recess is open inward in the radial direction and is formed between the first housing and a first internal-gear end face of the first rigid internal gear on a side of the first external-gear end face;
the second recess is open inward in the radial direction and is formed between the second housing and a second internal-gear end face of the second rigid internal gear on a side of the second external-gear end face; and
the first and second restraining members have a surface hardness having a value within a range from 90% to 99% of the surface hardness of the first and second external-gear end faces of the flexible external gear.

\* \* \* \* \*